T. A. EDISON.
STORAGE BATTERY.
APPLICATION FILED JAN. 20, 1917.

1,266,780.

Patented May 21, 1918.

Witnesses:
N. J. Fisher
William A. Hardy

Inventor:
Thomas A. Edison
by Dyer and Holden
his Attys.

UNITED STATES PATENT OFFICE.

THOMAS A. EDISON, OF LLEWELLYN PARK, WEST ORANGE, NEW JERSEY, ASSIGNOR TO EDISON STORAGE BATTERY COMPANY, OF WEST ORANGE, NEW JERSEY, A CORPORATION OF NEW JERSEY.

STORAGE BATTERY.

1,266,780.

Specification of Letters Patent.

Patented May 21, 1918.

Application filed January 20, 1917. Serial No. 143,465.

*To all whom it may concern:*

Be it known that I, THOMAS A. EDISON, a citizen of the United States, and a resident of Llewellyn Park, West Orange, Essex county, New Jersey, have invented certain new and useful Improvements in Storage Batteries, of which the following is a description.

My invention relates to storage batteries and more particularly to an arrangement for preventing such batteries from becoming sluggish or otherwise less effective in action under certain conditions.

It is well known that in cold weather and cold climates storage batteries become slower and less efficient in operation, and the principal object of my invention is to overcome this objection. I preferably attain this object by maintaining the temperature of such batteries and the electrolyte thereof above the point below which their action is adversely affected.

Other objects and features of my invention reside in the construction of parts and combination of elements hereinafter more specifically described and claimed.

Figure 1:
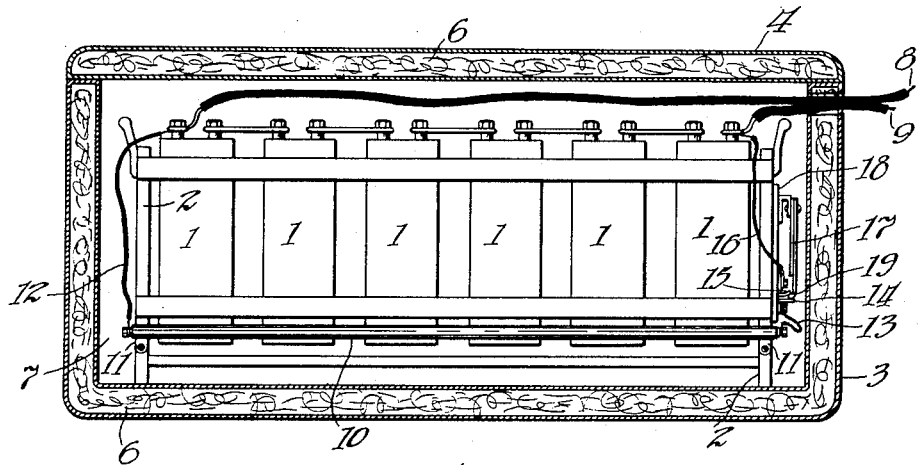
Figure 2:
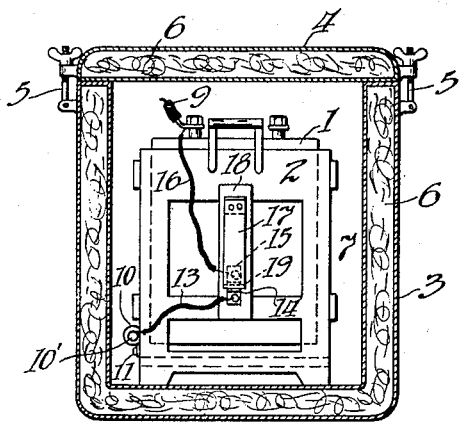

In order that my invention may be more clearly understood, attention is directed to the accompanying drawing, forming part of this specification, and in which:

Figure 1 is a view in side elevation, partly in section, of a device illustrating my invention; and Fig. 2 is an end elevation, partly in section, of the device shown in Fig. 1.

Referring to the drawing, reference characters 1, 1, etc., represent a set of storage battery cells, shown as storage battery cells of the Edison type, which are suitably supported in an open tray 2, such as is commonly employed for carrying Edison storage batteries. The tray 2 with the cells 1 mounted therein is disposed in and preferably entirely inclosed by a heat insulating compartment or case 3 having a cover 4. The cover 4 is preferably secured in position on the case 3 by any suitable means, such as clamps 5. The case 3 is preferably provided with double walls and the space between such walls is preferably filled with cow's hair or other suitable material in order to render said casing a better heat insulator. Preferably, the compartment or case 3 is of such size as to provide an air space or chamber 7 about and substantially inclosing the set of battery cells 1. The cells 1 are shown as connected in series and conductors 8 and 9, forming a part of the main battery circuit, are respectively secured to the terminals of the battery set, and extend from the case 3 through a suitable opening in one end thereof, in which opening these conductors fit closely.

Reference character 10 represents a metallic heat radiating tube containing an electric heating coil 10', this tube preferably being of approximately the same length as the tray 2 and preferably being suitably supported from the latter, as by means of brackets 11, adjacent the battery cells 1. One end of the heating coil 10' in tube 10 is connected by a conductor 12 to one terminal of the set of cells 1, and the other end of said coil is connected by a conductor 13 to the contact 14 of a pair of spaced contacts 14 and 15. The contacts 14 and 15 are mounted on a vertical wooden member 18 secured to the right hand end wall of tray 2. The contact 15 is connected by a conductor 16 to that terminal of the set of cells opposite to the terminal to which the conductor 12 is connected. Reference character 17 represents a thermostat which is vertically disposed in the space between the right hand end of the battery tray 2 and the adjacent end of the case 3, the upper end of said thermostat being secured to member 18 and the lower end thereof being provided with a projection 19 so disposed as to control the making and breaking of the circuit of the heating coil 10' at contacts 14 and 15.

The operation of this device is thought to be obvious, but may be briefly described as follows:—The thermostat 17 of course contracts as the temperature of the air in the chamber or space 7 falls, and is so arranged that when said temperature reaches a certain point, below which the action of the cells 1 and the electrolyte thereof is liable to be rendered less effective, the projection 19 will be brought into a position bridging the contacts 14 and 15. The circuit through the heating coil 10' will then be closed and such coil will be supplied with current from the set of cells 1. The coil 10 will now act to heat the air in chamber 7, the cells 1 and the electrolyte of the latter until the temperature of the air in said chamber is raised to such a point as to cause an expansion of thermostat 17 sufficient to move the projection 19 away from contacts 14 and 15 and break the circuit through said coil. It is therefore apparent that this device operates automatically to maintain the cells and electrolyte in such a condition that they will not be adversely affected when used in cold weather or cold climates.

The device shown is capable of being modified in many ways without departing from the spirit of my invention, and accordingly I wish it to be understood that I am not limited to the exact details shown and described.

Having now described my invention, what I claim and desire to protect by Letters Patent is as follows:—

1. The combination of a storage battery, and means for heating the electrolyte thereof by current from such battery, substantially as described.

2. The combination of a storage battery, means utilizing current from such battery for heating the electrolyte of the latter, and a thermostatic device for controlling the supply of such current to said means, substantially as described.

3. In a device of the class described, a storage battery, electrical means for heating the electrolyte of said battery adapted to be supplied with current from the battery, and a device controlled by variations in temperature for controlling the supply of such current to said means, substantially as described.

4. In a device of the class described, a storage battery, means inclosing said battery and providing an air space about the same, and electrical heating means in said space in circuit with the battery, substantially as described.

5. In a device of the class described, a storage battery, means inclosing said battery and providing an air space about the same, electrical heating means in said space in circuit with the battery, and a device controlled by variations in temperature for controlling the circuit of said heating means, substantially as described.

6. In a device of the class described, a storage battery, means inclosing said battery and providing an air space about the same, electrical heating means in said space in circuit with the battery, and a device located in said space and controlled by variations in temperature for controlling the circuit of said heating means, substantially as described.

7. The method of preventing a storage battery from becoming less effective in operation when subjected to low temperatures, which consists in utilizing current from such battery to heat the electrolyte thereof, substantially as described.

This specification signed and witnessed this 16th day of January, 1917.

THOS. A. EDISON.

Witnesses:
WILLIAM A. HARDY,
FREDERICK BACHMANN.